Jan. 7, 1969  L. VADAS  3,420,284
APPARATUS FOR CONTOUR PEELING PINEAPPLE
Filed June 20, 1966
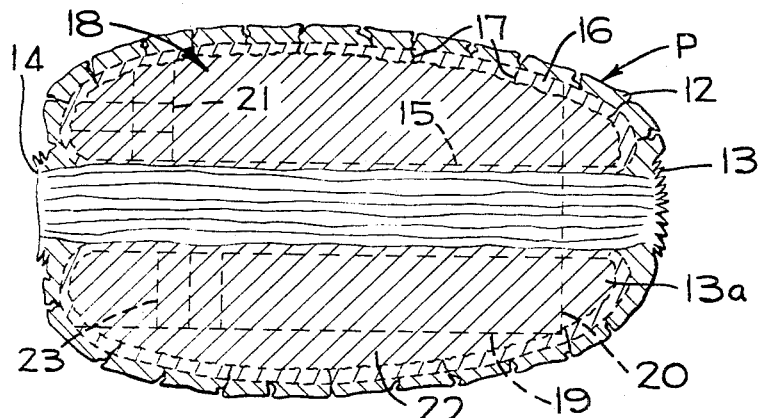
FIG_1
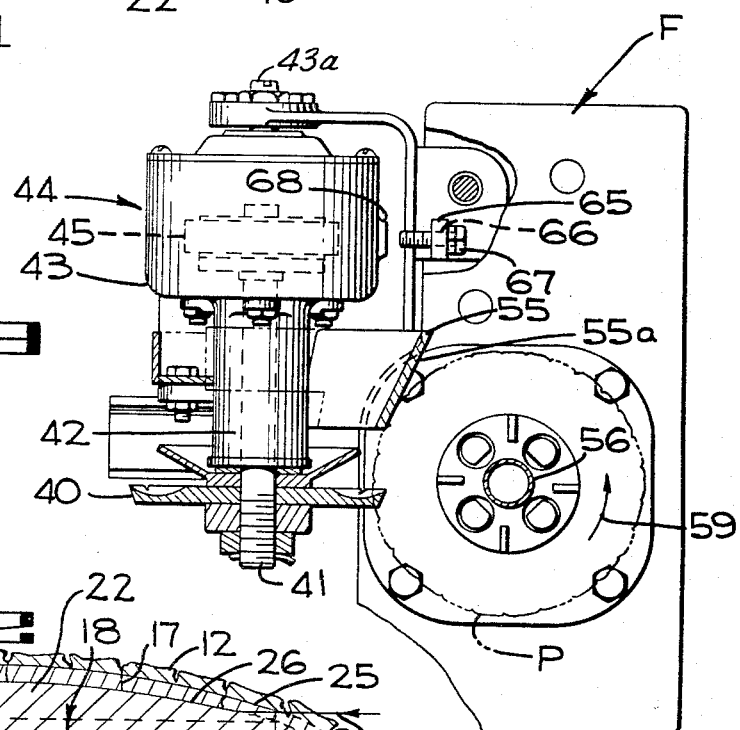
FIG_3
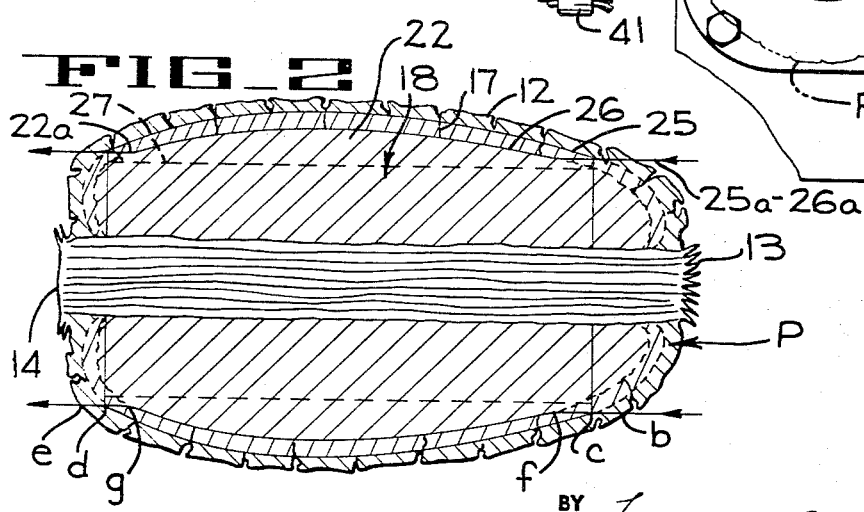
FIG_2
INVENTOR
LESLIE VADAS
BY *Francis W. Anderson*
ATTORNEY

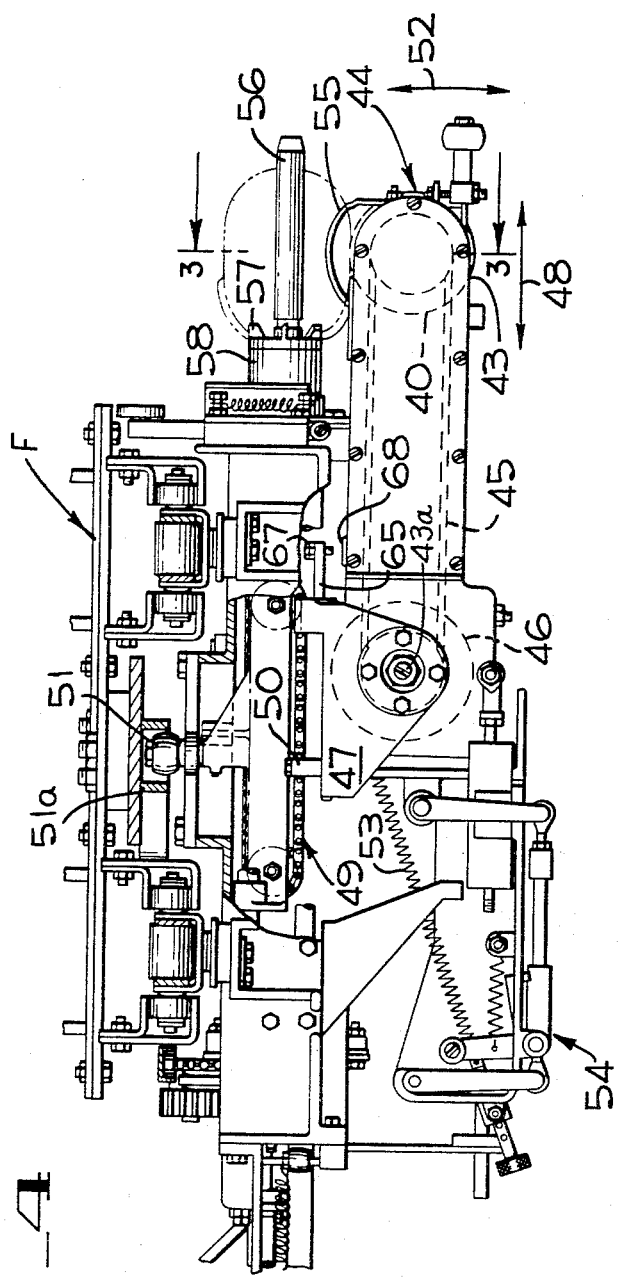
FIG_4
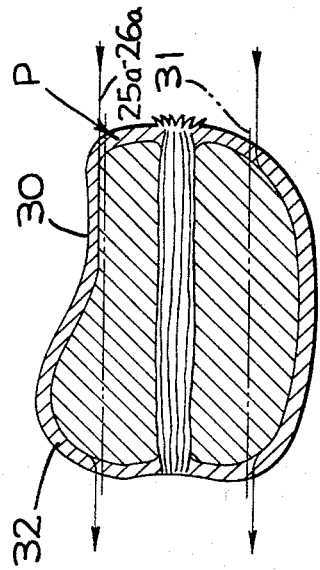
FIG_5
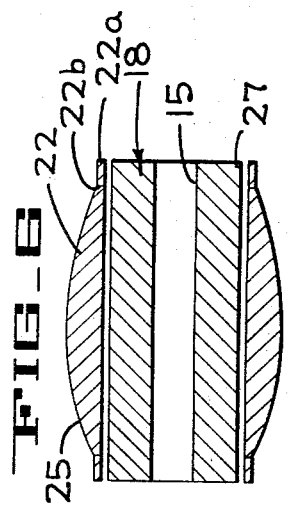
FIG_6

United States Patent Office 3,420,284
Patented Jan. 7, 1969

3,420,284
APPARATUS FOR CONTOUR PEELING PINEAPPLE
Leslie Vadas, Los Gatos, Calif., assignor to FMC Corporation, San Jose, Calif., a corporation of Delaware
Filed June 20, 1966, Ser. No. 558,815
U.S. Cl. 146—6           2 Claims
Int. Cl. A23n 7/00

ABSTRACT OF THE DISCLOSURE

A contour pineapple peeler is provided wherein a rotary cutter and depth gauge are mounted at the end of an elongate housing. The housing is pivoted on a carriage that moves the housing and cutter parallel to the pineapple axis, and an auxiliary depth gauge is disposed between the cutter housing and the carriage to limit depth of cut at the ends of the pineapple.

---

This invention pertains to an apparatus for processing fruit, like pineapples, and more particularly, to an improved apparatus for more effectively controlling the distribution of the pineapple into products of various values.

Heretofore pineapples were processed using a Ginaca machine. In general, this machine cored and removed from the center of the pineapple a cylinder of fruit suitable for canning. The Ginaca machine fulfilled the needs of the pineapple industry for a long period but eventually became undesirable as it failed to conform to the shape of a pineapple thus leaving valuable fruit remaining in the pineapple to be downgraded into products of less value. With the increase in the cost of hand labor and the desire for obtaining from the pineapple the optimum amount of products which would command the highest prices on the market in relation to the costs of producing these products it became apparent that new processes and machines were needed.

One approach to more efficiently distributing the portions of the pineapple into the optimum amount of the most valuable products and to reduce the amount of hand labor is exemplified in the patent to Farmer 3,236,276 which describes a re-sizing type of method. The re-sizing method employs successive cylindrical cuts in a pineapple at decreasing diameters. This method, however, still was inadequate since blanks or gaps of high quality products were not removed and, consequently, these remaining products became downgraded into products of less values.

An improved method and an apparatus were also developed wherein the pineapple was peeled by a cutter which followed closely the contour of the skin leaving a spheriod of high quality product. This method required substantially less hand labor to trim any remaining undesirable products from the spheroid. My copending application Ser. No. 414,121, filed Nov. 27, 1964, now Patent No. 3,352,337, describes this method and apparatus. The apparatus of the subject application are directed to specific forms of the invention described in said copending application.

It is an object, therefore, of this invention to provide an improved apparatus for treating pineapples with a minimal amount of hand labor.

Another object of this invention is to provide an improved apparatus for treating pineapples to obtain a greater yield of more valuable products.

Another object of this invention is to provide an apparatus for processing pineapples to obtain a greater yield of more valuable products from pineapples having irregular shapes.

Another object of this invention is to provide an apparatus for processing pineapples to obtain a greater yield of more valuable products by reducing the loss of high value fruit adjacent the ends of pineapples.

Another object of this invention is to provide an improved apparatus for controlling the depth of cut while contour-peeling pineapples.

Another object is to provide an apparatus for peeling a pineapple including a knife adapted to move through the pineapple beneath the skin thereof and following the contour of the skin but limiting the depth of the cut to predetermined diameter.

Other and further objects and advantages of the present invention will be apparent from the following description and the accompanying drawings in which:

FIGURE 1 is a diagrammatic longitudinal section of a typical pineapple showing the major product areas.

FIGURES 2 is a diagrammatic longitudinal section of a pineapple showing the various cuts made by using the improved method and apparatus of this invention.

FIGURE 3 is an enlarged section of the improved apparatus with parts broken away and taken generally on line 3—3 of FIGURE 4.

FIGURE 4 is a fragmentary plan of the machine described in said copending application with parts broken away and with the addition of the improved structure of the subject invention.

FIGURE 5 is a diagrammatic longitudinal section of an irregularly shaped pineapple and showing a cut made by using the improved method and apparatus of this invention.

FIGURE 6 is a diagrammatic, exploded longitudinal section of a pineapple with parts thereof removed.

In order to understand the nature of the contribution which this apparatus has made in the art of processing pineapples it is necessary to understand how the products which are derived from the pineapple are distributed in the pineapple and the relative value of each of these products. As shown in FIGURE 1 each pineapple can be divided into different products which vary substantially in value. For example, a pineapple designated by the reference character P consists of a skin 12, a top end 13 and a bottom end 14. The skin and the top and bottom ends (after any remaining fruit, such as that which is indicated by the numeral 13a, is removed) are generally of low value and are used primarily as animal feed. The fruit which is attached to these low value parts and is removed, as mentioned above, is often crushed into juice product. The pineapple also has a longitudinal core which is typically removed as a core segment 15. Just inside the skin is a portion of the fruit which will be referred to as the juice layer 16 and which along with the core segment is crushed to make pineapple juice product. Although the juice layer has a pleasant taste it is not used for higher value products because of penetration into this layer of the eyes 17 of the pineapple. The eyes are actually the inner ends of the stems associated with the familiar prickly leaves projecting from the skin of the pineapple.

Next to the juice layer is a central portion of the fruit or spheroid 18 which, after the core segment is removed, is the most valuable portion of the fruit. Using conventional methods of processing, a cylinder is cut from the spheroid which is then divided into slices. This operation is known as "sizing." The dotted line 19 in the lower half of the pineapple, as viewed in FIGURE 1, represents the outer periphery of such a cylinder used for slice product. The dotted line 20 represents the end of the cylinder after the top end 13 is removed. These dotted lines are used only for description, it being understood that in the actual conventional method the cylinder would appear in cross-section as two spaced peripheral lines similar to dotted line 19 and two spaced end lines similar to dotted line 20. Only one each of these lines has been shown, however, in order to describe alternative products which may be derived from the spheroid.

Since the entire spheroid is of high quality fruit it also could be used for making chunks or tidbits as represented by the dotted lines 21 and 23, respectively, rather than slices. Likewise the outer portion of the spheroid which remains after a cylinder is removed could also be used for chunks. Most commonly, however, this portion is used for making crush product and will be designated hereinafter as a crush blanket 22. It should be emphasized, however, that the entire spheroid except for minor trimming may be used for cutting into slices, chunks, tidbits or other shapes and sizes depending on consumer demand. These products are known as solid pack products.

Each of the aforementioned products represent different values to the pineapple processor. Using present standards, for example, a rough estimate of the value of each of the products with respect to the costs necessary to produce these products is as follows:

(1) The most valuable is the solid pack product (slices, chunks, or tidbits) which is approximately sixty percent more valuable than crush product and is approximately five times more valuable than juice product.

(2) Crush product is approximately three times more valuable than juice product and is approximately nine times more valuable than skin and end products.

(3) Juice product is approximately three times more valuable than skin and end products.

Considering these values in relation to the enormous quantities of pineapples processed each year, estimated at 4,000,000,000 pounds, it can be readily understood that the greater the distribution of the various portions of the fruit which result in solid pack product the greater the monetary yield derived from each pineapple processed. Likewise, each portion of the pineapple which can be used for the next more valuable product also increases the yield of each pineapple. Consequently, since slice product is the most common product produced, it is critical that each cut which impairs so much as one available slice from each pineapple and thus downgrades that slice to a lower valued product, such as crush or juice products, will very substantially affect the effectiveness of the method and apparatus employed to process the fruit. With this background in mind the method and apparatus of the subject invention will now be described.

As is shown in FIGURE 2, the method of the subject invention employs a series of successive cuts which generally follow the outside contour of the pineapple with the exceptions of cuts made near the ends and at irregularly shaped portions of the pineapple. These successive cuts are taken over the entire pineapple from end to end. A first cut, designated by the numeral 25, is taken generally along a curved plane parallel to the outer skin of the pineapple and at a depth of approximately 5/16 of an inch. The layer removed by this cut contains the outermost portions of the leaf stems and the skin and becomes mill or feed product.

A second cut, designated by the numeral 26, is taken approximately 5/16 of an inch in from the first cut 25 or a total of 5/8 of an inch in from the outside of the pineapple also along a curved plane which is parallel to the outer surface of the pineapple. As the eyes 17 of the fruit generally do not extend in from the skin more than 5/8 of an inch this second cut usually removes all of the eyes of the pineapple. The layer removed by the second cut, however, contains these undesirable eyes and is used for juice product. The number and depth of the cuts may be varied and, for example, should a single 5/8 inch cut be desired, the layer of the fruit from which juice product is made and which would normally be removed by the second cut is left attached to the skin and may be removed later by conventional eradication equipment.

If either the second cut or the single cut, which removes approximately the outer 5/8 of an inch of the pineapple, would continue to follow the contour of the skin adjacent the ends of the pineapple substantially all of the eyes 17 penetrating into the fruit would be removed. However, in removing the fruit adjacent the ends of the pineapple a portion of otherwise excellent solid pack product is removed and thus is downgraded to juice product. This occurs because the depth of penetration of the eyes adjacent the ends of the pineapple is not uniform and some of the eyes do not penetrate into the pineapple a full 5/8 of an inch. It has been found that some of the solid pack product, where there was little or no eye penetration was unnecessarily being removed by these deeper cuts thus reducing the yield of the pineapple.

As shown in FIGURE 2, the subject method employs the step of limiting the inward travel of the cutter to a predetermined cylindrical plane, indicated by the numerals 25a–26a, extending radially outward from the longitudinal axis of stem of the pineapple and over the length thereof. The diameter of the cylindrical plane is set for optimum recovery. Using present day processing practices this would be a diameter slightly greater than the diameter of the cylinder to be cut from the pineapple for making slices or tidbits. For example, if the cylinder to be cut is 3¼ inches in diameter, a typical setting for the cylindrical plane is 3 5/16 inches in diameter. When the cutter approaches the end of the pineapple it enters along the cylindrical plane, then follows the contour of the pineapple, and finally leaves the path following the contour of the pineapple and again cuts along the cylindrical plane. After peeling, the ends 13 and 14 and the core 15 are cut from the pineapple and the peeled spheroid is cut into chunks or into a cylinder for slices or tidbits. If a cylinder is cut, as indicated by the numeral 27, the remainder of the spheroid, described above as the crush blanket 22, is removed and is used for products of a value less than solid pack products.

As is also shown in FIGURES 2 and 6, the crush blanket 22 will have flattened cylindrical ends 22a which will occasionally have eyes 17 penetrating into them. These ends are trimmed from the crush blanket and used for juice product whereas the remainder of the blanket is used for crush product. The ends may be trimmed, usually cutting along a line 22b that is spaced in from the ends of the blanket no more than one inch. This cut may be made by hand, or the blanket may be flattened, placed on a belt (not shown) and passed between a pair of spaced cutting disks (also not shown). The details of the belt and cutting disks are quite simple and since conventional equipment could be adapted for this purpose, no further description will be given.

The cylinder removed from the pineapple will also occasionally have eyes 17 penetrating into it adjacent the ends thereof. These eyes are removed by hand picking or trimming. Should the cylinder then be cut into slices, only those cylinders having had a substantial number of eyes removed by hand picking or trimming will have end slices unfit for slice product. The other pineapples having little or no eye penetration will yield an entire cylinder of slice product. Since only a few of the spheroids will require such trimming a substantial savings is accomplished over and above a cut which follows the entire contour exactly.

The above described method, which is adapted for present day processing practices, may be modified for future practices to obtain an even greater yield of solid pack products. As was mentioned above, using present practices the cutter is limited to inward travel along a cylindrical plane having a diameter slightly greater than the diameter of the cylinder to be cut from the pineapple. In the future pineapples may be used primarily for chunks or other products not requiring a cylinder; therefore, in such a case the entire spheroid, after removing the core, may be used for high value solid products. The depth to which the cutter will be limited will be determined by the average size of the pineapples being processed and will in most instances be along a cylindrical plane of a diameter greater than the diameter used under present day practices. This, of course, will increase the size of the spheroid and further reduce the amount of pineapple removed for products of lower value.

Another area in which the subject method is particularly important is in the processing of irregularly shaped pineapples. As shown in FIGURE 5 pineapples sometimes have a non-symmetrical portion or flat 30 in which the outer skin of the pineapple is much closer to the longitudinal axis of the pineapple than it normally shaped. Reference numeral 31 represents a cylinder which corresponds to a sizing operation in present day pineapple processing. In the area of the flat it can be seen that the skin is closer to the cylinder and, more importantly, that the eyes are likewise much closer to the cylinder. The area indicated by numeral 32 represents a layer cut deep enough to include the eyes. If an exact contour cut was made, for example, 5/8 of an inch in from the skin, the cut would extend into the cylinder 31 in the area of the flat regardless of the true depth of penetration of the eyes. Consequently, the subsequently cut slices in the area of the flat would not be used for slice product and would be downgraded. The subject invention overcomes this problem by limiting the depth of cut in the vicinity of the flat to a cylindrical plane 25a–26a which lies outside of the cylinder 31. In this manner should the eyes penetrate into the cylinder they could be hand trimmed or hand-picked out of the slices or, as is often the case, if the eyes were not uniform and did not penetrate into the cylinder the slices in the area of the flat would all be available for slice material.

An apparatus which will perform the subject method is the apparatus described in my copending application serial No. 414,121, with some modification. The description of the apparatus described in said copending application is thus incorporated herein by reference thereto. Since the modification necessary for carrying out the subject method is limited to a small area of the entire processing machine only the portions of the apparatus described in said copending application wherein modification is required will be described herein.

In FIGURE 3, a peeling cutter 40 is shown keyed to a shaft 41 that is journalled for rotation in a boss 42 which is bolted to the free end of an elongated drive belt and cutter housing 43 of a cutter unit 44. The cutter is driven by a belt and pulley drive 45 (shown in dotted lines) which is connected to an electric motor 46 (FIG. 4). The cutter unit 44 is pivotally mounted at 43a on a carriage 47 which is mounted in the processing machine F for reciprocation in the direction indicated by the arrow 48. This reciprocation is effected by a chain mechanism 49 which is connected to the bracket by a boss 50 fastened to the bracket. A cam follower 51 rides in a cam track 51a and effects reciprocation of the chain mechanism and thus the cutter unit in the direction of the arrows 48 in the exact same manner as in said copending application.

As mentioned, the cutter unit 44 also is mounted at 43a to pivot about the bracket 47 in the direction of the arrow 52. The unit is normally biased in the counterclockwise direction, as viewed in FIGURE 4, by an adjustable spring 53. Also, the unit can be latched out of engagement with the pineapple in the clockwise direction, as viewed in FIGURE 4, by latching mechanism 54. The details of the pivotal mounting and the latching mechanism are not important to the subject application and may be obtained from said copending application. A contour gauge 55 is fastened to the cutter housing 43 above the cutter 40. As best shown in FIGURE 3 the gauge has an outwardly and upwardly directed frusto-conical surface 55a which is intended to engage the outer skin of a rotating pineapple P shown in phantom lines.

To effect rotation of the pineapple it is impaled on a spindle or coring tube 56 and a pronged carrier 57. The spindle and pronged carrier are carried by a housing 58 which is rotated by any conventional means, not shown, in the processing machine F. When the pineapple is rotated and the cutter unit is moved into engagement therewith the gauge 55 rides over the skin. The cutter 40 extends outwardly beyond the bottom of the gauge to extend into the pineapple when the gauge is resting on the skin. So that the depth of cut relative to the gauge may be varied the gauge may be adjustable positioned on the housing or, in the alternative, the size of the cutter may be changed to one of a greater or smaller diameter. Thus, if the pineapple is rotated in the direction of the arrow 59 (FIG. 3) and the cutter unit is moved to traverse the rotating pineapple from right to left, as viewed in FIGURE 4, while the gauge rides over the skin of the pineapple, the cutter 40 will penetrate into the pineapple the desired depth and will cut therefrom a substantially continuous peel. With the structure as thus far described the cutter will enter the pineapple near its outer end and will remove a cut which conforms to the outer contour of the pineapple.

The auxiliary apparatus to override the gauge 55 and to limit the depth of penetration of the cutter 40 into the pineapple at each end thereof will now be described. As is best shown in FIGURES 3 and 4, this structure is in the form of an extension member 65 which may be welded or formed on the carriage 47. The extension member has a threaded aperture 66 (FIG. 3) at its outer end. The aperture receives an adjustable limit bolt 67 which protrudes out of the extension member toward the cutter housing 43. A wear plate 68 is fixed to the cutter housing 43 in a position to abut against the end of the limit bolt. As may be readily seen, when the limit bolt is extended in the direction of the cutter housing, counterclockwise pivotal movement of the cutter unit toward the pineapple P will be limited thus limiting the depth of penetration of the cutter into the pineapple.

Apparatus for cutting the cylindrical core, slices, chunks or tidbits is all conventional and well known in the art and will not be described.

The method and operation of the apparatus of the subject invention for use in present day practices will be best understood by referring to FIGURE 2 wherein $b$ represents the point on the pineapple at which the cutter 40 will first enter the skin. To cause the cutter to enter at his point, the limiting bolt 67 is set to allow the cutter to move inwardly toward the spindle 56 an amount just outside the diameter of the cylinder which will be later cut from the pineapple. In other words, the depth of penetration to which the cutter should be limited is determined by the diameter of the cylinder to be cut from the pineapple. The cutter will enter the pineapple at point $b$ and will move longitudinally therethrough. If the first cut is to remove the skin only and will follow the cut 25, the cutter will move inwardly longitudinally of the pineapple until the gauge moves away from the cylinder an amount equal to the depth of the desired cut as indicated by the point $c$ and will then follow the line 25 until it reaches the point $d$ where it will again be limited to the diameter of the cylinder and will move longitudinally out of the end 14 at the point $e$. In the second cut, which will follow the line 26, the cutter will again contact the pineapple at the point $b$ and will move longitudinally of the pineapple following the previous cut and will begin to cut into the pineapple at the point $c$. In the second cut, however, the cutter will continue moving longitudinally in the pineapple until it reaches the point $f$. At the point $f$ the cutter will make a cut parallel to the contour of the outer surface of the pineapple with its skin removed and will traverse the length of the pineapple until it reaches the point $g$. At the point $g$ the cutter will again will be limited to longitudinal movement and will pass out of the fruit at the point $d$ and out of contact with the pineapple at the point $e$.

As was mentioned earlier, the spheroid is then cored and the ends removed. Any fruit remaining on the ends is eradicated. The remainder of the spheroid may then be cut into chunks, or into a cylinder for slices or tidbits and a crush blanket. The crush blanket is further trimmed to remove its cylindrical flattened ends. All of these operations are performed on conventional or easily adaptable conventional equipment, not shown.

It should be readily apparent that the subject invention provides an advantageous method and apparatus for improving the distribution of high value products in the pineapple. A particular advantage is the increase in high value products adjacent the ends of the pineapple which savings amount to a substantial increase in monetary yield per pineapple processed.

While a particular embodiment of the invention has been described it will be understood that the subject method and apparatus is capable of variation without departing from the principles of the invention and that the scope of the invention should be limited only by the scope and interpretation of the claims appended hereto.

Having thus described the invention that which is claimed as new and what is desired to be protected by Letters Patent is:

1. A contour peeler for pineapples comprising means for rotating the pineapples about their core axes, a cutter carriage, means for advancing the carriage parallel to the axis of pineapple rotation, a pivot on said carriage extending perpendicular to the direction of carriage motion, an elongate cutter housing projecting from said pivot substantially parallel to the axis of pineapple rotation, a rotating cutter at the free end of said housing and having its axis generally parallel to said pivot, a depth of cut contour gauge at said cutter; and an auxiliary depth of cut gauge for overriding said contour gauge at each end of the pineapple, said auxiliary depth gauge comprising cooperating stop means on said carriage and said housing for limiting inward pivotal motion of the housing.

2. The contour peeler of claim 2, wherein said auxiliary depth gauge stop means comprises an adjustable stop bolt.

References Cited
UNITED STATES PATENTS

| | | | |
|---|---|---|---|
| 1,590,162 | 6/1926 | Hargreaves | 146—6 |
| 2,034,160 | 3/1936 | Taylor | 146—6 X |
| 2,243,657 | 5/1941 | Tachi | 146—203 X |
| 2,410,683 | 11/1946 | Marquez | 146—43 |
| 3,036,920 | 5/1962 | Farmer | 146—6 X |

W. GRAYDON ABERCROMBIE, *Primary Examiner.*

U.S. Cl. X.R.

146—43

UNITED STATES PATENT OFFICE
CERTIFICATE OF CORRECTION

Patent No. 3,420,284

January 7, 1969

Leslie Vadas

It is certified that error appears in the above identified patent and that said Letters Patent are hereby corrected as shown below:

Column 6, line 45, "his" should read -- this --. Column 8, line 11, the claim reference numeral "2" should read -- 1 --.

Signed and sealed this 14th day of April 1970.

(SEAL)
Attest:

Edward M. Fletcher, Jr.
Attesting Officer

WILLIAM E. SCHUYLER, JR.
Commissioner of Patents